United States Patent [19]

Ross

[11] Patent Number: 5,762,421
[45] Date of Patent: Jun. 9, 1998

[54] REUSABLE BULK BAG WITH LINER

[75] Inventor: Kurt D. Ross, Atlanta, Ga.

[73] Assignee: Grayling Industries, Inc., Alpharetta, Ga.

[21] Appl. No.: 548,056

[22] Filed: Oct. 25, 1995

[51] Int. Cl.$^6$ ..................................................... B65D 39/08
[52] U.S. Cl. ............................................ 383/111; 383/119
[58] Field of Search .................................. 220/403, 404; 383/111, 119, 66, 67, 109

[56] References Cited

U.S. PATENT DOCUMENTS

| | | | |
|---|---|---|---|
| 2,352,503 | 6/1944 | Walton | 220/404 |
| 3,214,320 | 10/1965 | Lappala et al. | 383/119 |
| 3,567,104 | 3/1971 | Arslanian | 220/404 |
| 3,592,722 | 7/1971 | Dawbarn | 383/119 |
| 3,739,827 | 6/1973 | Sondel | 220/403 |
| 3,958,749 | 5/1976 | Goodrich | 383/111 |
| 4,132,594 | 1/1979 | Bank et al. | 383/119 |
| 4,596,040 | 6/1986 | LaFleur et al. | 383/7 |
| 4,597,102 | 6/1986 | Nattrass | 383/105 |
| 4,781,472 | 11/1988 | LaFleur et al. | 383/17 |
| 4,805,799 | 2/1989 | Robbins, III | 220/403 |
| 4,874,258 | 10/1989 | Marino | 383/111 |
| 4,948,266 | 8/1990 | Bencic | 220/404 |
| 4,979,628 | 12/1990 | Robbins, III | 220/403 |
| 5,014,872 | 5/1991 | Robbins, III | 220/403 |
| 5,027,963 | 7/1991 | Robbins, III | 220/403 |
| 5,192,134 | 3/1993 | Polett | 383/111 |
| 5,337,914 | 8/1994 | Mulder | 220/404 |
| 5,492,270 | 2/1996 | Avery et al. | 220/403 |
| 5,529,393 | 6/1996 | Polett | 383/111 |
| 5,538,155 | 7/1996 | Hoekstra | 220/403 |

FOREIGN PATENT DOCUMENTS 338181  10/1989  European Pat. Off. .............. 383/111

*Primary Examiner*—Stephen P. Garbe
*Attorney, Agent, or Firm*—Kennedy, Davis & Kennedy

[57] ABSTRACT

A liner (10) is provided for use in a bulk bag (12) of the type for storing and transporting fungible materials. The liner has a bottom wall (23), a top wall (24), and side walls (22) extending between the bottom wall and the top wall to define a storage space. The liner also has a reinforced top collar (34) extending from the side walls which is stitched to the sides of a bulk bag.

14 Claims, 2 Drawing Sheets

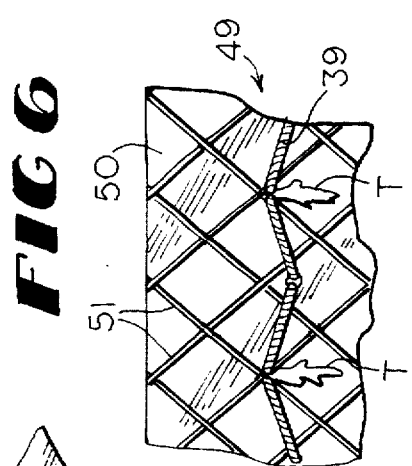
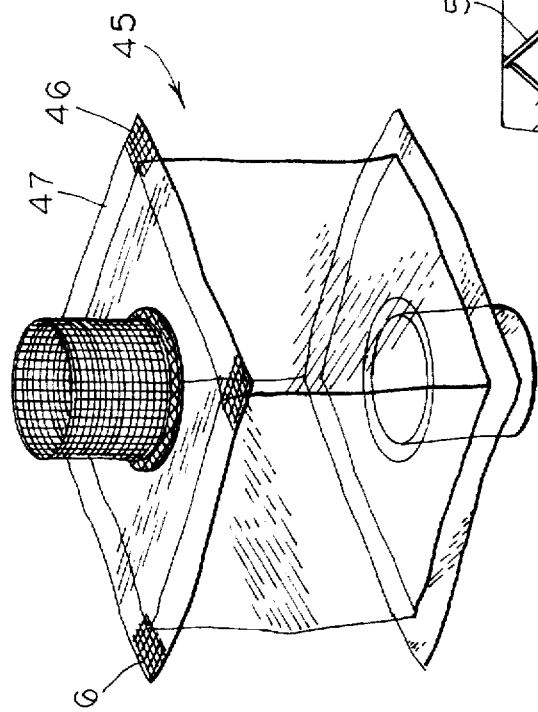
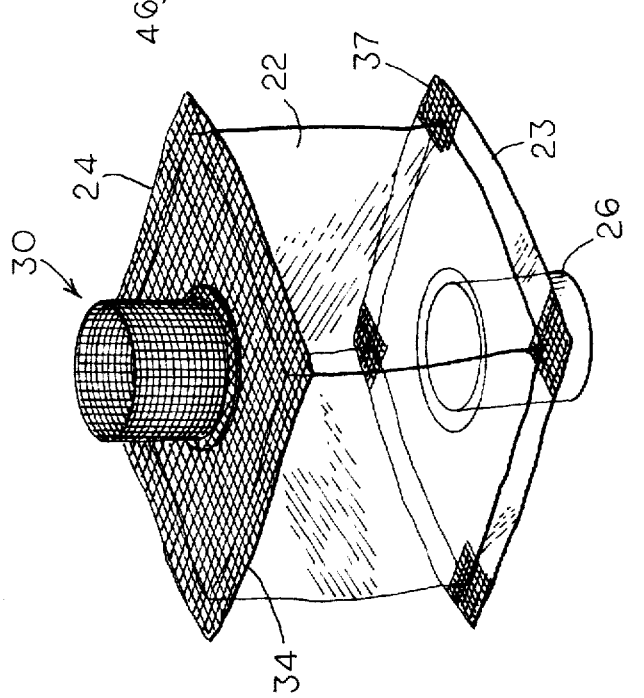

REUSABLE BULK BAG WITH LINER

TECHNICAL FIELD

The present invention relates generally to containers, and particularly to large bulk bags with liners used in storing and transporting fungible materials.

BACKGROUND OF THE INVENTION

Materials in granular and powder form are typically stored and transported in large containers, commonly referred to in the industry as bulk bags or fiber intermediate bulk containers (F.I.B.C). These bulk bags are usually made of woven fabrics such as woven polypropylene which are capable of holding large, heavy quantities of materials, typically weighing a ton or so. Liners are commonly used for the interior of bulk bags to provide a moisture barrier. Conventional liners are made of flexible materials such as polyethylene or nylon that are tubular or specifically configured to form to the shape of the bulk bag, i.e. form-fitted liners.

Problems with liners often occur during filling of the bulk bags. The tubular liners often become folded over, thus reducing their holding capacity and consequently the capacity of the bulk bags. This problem also occurs with form fitted liners which are not properly positioned within the bulk bag.

Another common problem with both types of liners is that they sometimes tear from the weight of their contents, thus allowing the materials contained therein to leak into and contaminate the bulk bags. Once a bulk bag is contaminated, it cannot be reused unless it is thoroughly cleaned. As cleaning is costly compared to the value of the bulk bags, the industry tends to discard contaminated bags rather than process them for reuse.

Thus, there exists a need for an improved liner for bulk bags such that the bulk bags are protected from contamination and are rendered reusable without the need for cleaning. Accordingly, it is to the provision of such that the present invention is primarily directed.

SUMMARY OF THE INVENTION

In a preferred form of the invention, a liner for a bulk bag of the type used in storing and transporting materials has a flexible plastic bottom and sides that define a storage space. The liner has a reinforced plastic collar that extends from the sides distally from the bottom and means for releasibly fastening the reinforced collar to the sides of a bulk bag as with stitching. Thusly constructed, the liner may be inserted into the bulk bag and its reinforced collar releasibly fastened to the bulk bag to provide a barrier between stored fungible and the bulk bag. The liner may be reused by removing the stitching and removing the liner from the bulk bag for cleaning.

BRIEF DESCRIPTION OF THE DRAWINGS

FIG. 4 is a perspective view of the liner shown in FIG. 1 in an assembled configuration.

FIG. 5 is a perspective view of a bulk bag liner in another preferred form of the invention.

FIG. 6 is a side view of an alternative reinforcing material for use in constructing a portion of the liner of FIGS. 1 or 5.

DETAILED DESCRIPTION OF THE INVENTION

Figure 1:
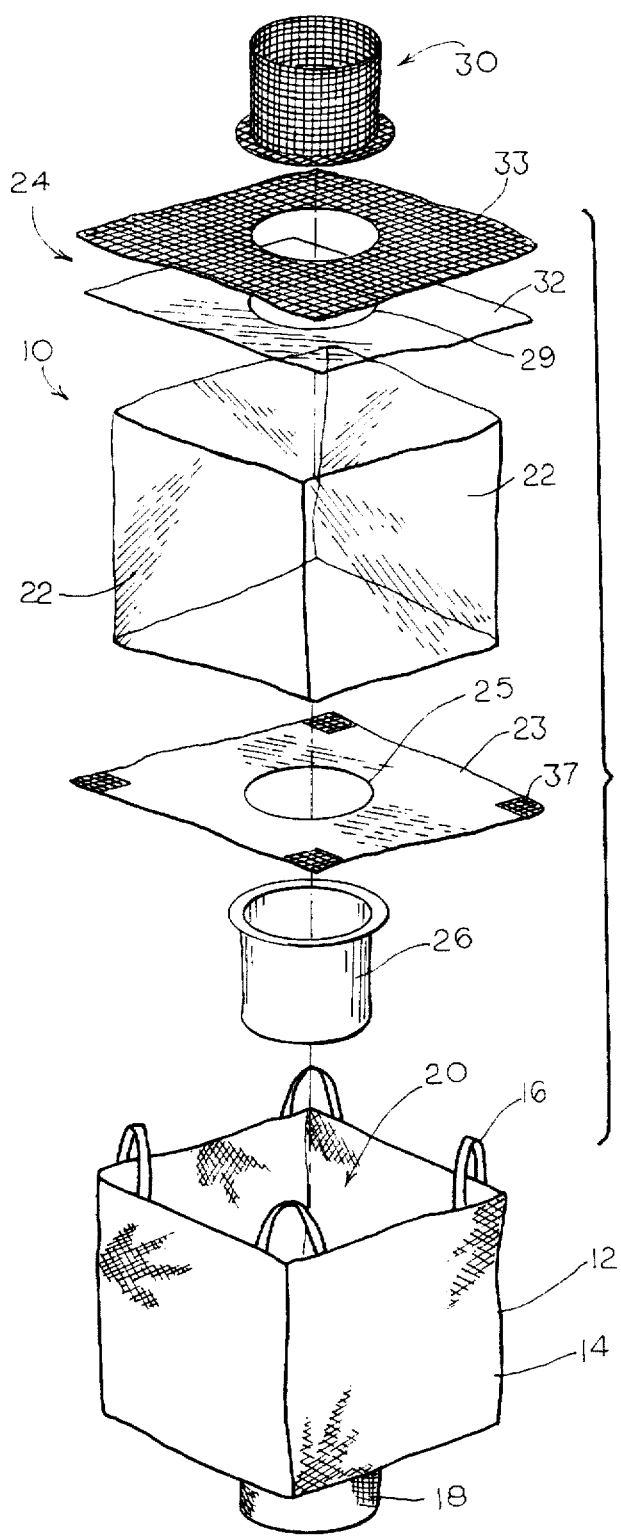
FIG. 1 is an exposed view, in perspective, of a bulk bag and liner embodying principles of the invention in a preferred form.

Referring next to the drawings, there is shown a form-fitted liner 10 for a conventional bulk bag 12. The bulk bag 12 has four sides 14, an unshown bottom, four carrying loops or handles 16 and a bottom spout 18. The bag 12 thus defines an open top storage space 20. The bulk bag is conventionally made of woven polypropylene.

The liner 10 provides a storage compartment have four side walls 22, a bottom wall 23 heat sealed to the bottom edge of the side walls 22, and a top wall 24 heat sealed to the top edge of the side walls 22. The bottom wall 23 has a central opening 25 therethrough and a bottom spout 26 depending therefrom which is heat sealed about the bottom wall central opening 25. Likewise, the top wall 24 has a central opening 29 therethrough and a top spout 30 extending therefrom which is heat sealed about the top wall central opening 29. The top wall 24 and top spout 30 are preferably made of a flexible, two ply plastic material having a low density polyethylene base layer 32 and a reinforcing, woven layer 33 made of a woven polyethylene, commonly referred to in the trade as woven polyethylene fabric and sold by Fabrene, Inc. of North Bay, Ontario, Canada. The reinforcement layer of the top wall is shown exploded but not so for the spout 30. The liner side walls 22 and bottom wall 23 are made of a flexible material, preferably polyethylene sheet material of 3 to 6 mils thickness.

The top wall 24 is sized to overhang the side walls 22 to form a top apron or collar 34, as best shown in FIG. 4. Similarly, the bottom wall 23 is sized to overhang the side walls 22 to form a bottom apron or collar 36. The bottom wall 23 has four corners 37, each being reinforced with a woven polypropylene material 33.

Figure 2:
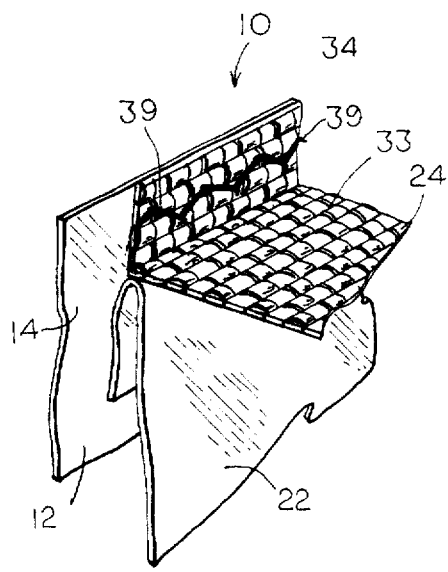
FIG. 2 is a perspective view of a portion of the liner and the bulk bag shown in FIG. 1 illustrating the attachment of the liner to the bulk bag.

With the liner 10 positioned snugly within the bulk bag space 20, the reinforced corners 37 of the bottom collar 36 are sewn to the respective corners of the bulk bag to prevent the lower portion of the liner from shifting or moving relative to the bulk bag itself. As shown in FIG. 2, the collar 34 is turned upward and positioned against the inner surface adjacent the top edge of the bulk bag sides 14 and secured thereto with stitching 39. Thus, again the stitching 39 maintains the position of the liner relative to the bulk bag 12. This prevents the liner from folding over during filling to maximize the capacity of the liner and consequently that of the bulk bag.

The bottom spout 18 of the bulk bag and the bottom spout 26 of the liner are twisted and tied off prior to filling. Once filled the top spout 30 is also twisted and tied off to seal the liner. The bulk bag bottom spout 18 and liner bottom spout 26 are later untied to release the fungible material.

Figure 3:
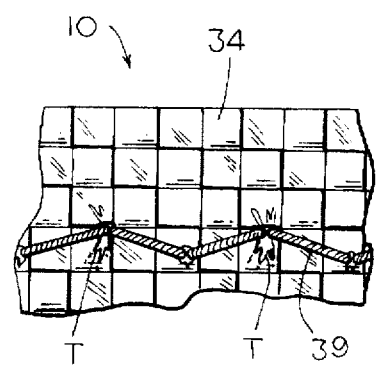
FIG. 3 is a side view of the liner and bulk bag portion shown in FIG. 3 illustrating the liner torn.

During storage and transportation of a filled bulk bag and liner, any tearing T of the liner 10 caused by its movement relative to the bulk bag, which often occurs due to the weight of the fungible materials therein, is likely to occur in the top collar 34 where it is joined to the bulk bag by stitching 39. However, this tearing of the liner is limited due to the reinforcement of the collar material. Should the stitching tear through one strip of the reinforcing woven layer 33, the stitching encounters an unperforated or untorn strip which is highly resistant to tearing than a perforated strand, as shown in FIG. 3. in other words, when tearing does occur the tear T itself is limited by the weave configuration of the mesh material. Moreover, this tearing of the collar does not cause a breech of the liner portions containing the material, thus preventing contamination of the bulk bag. The reinforcement of the top wall and top spout also prevents these components from breaching should a large amount of weight be placed upon the liner, as when several bulk bags are stacked one upon another.

Upon reaching its destination, the bag 10 may be emptied of its materials contents and the liner removed by simply cutting or otherwise removing the stitching 39. The bulk bag 12 may then be reused by positioning and securing another liner 10 therein. It should be understood that should it be desired to reuse a liner the perforated portion of collars 34 and 36 may be cut away to leave the unperforated portion for subsequent restitching.

Referring next to FIG. 5, there is shown a bulk bag liner 45 as an alternative embodiment. Here, the structure of the liner is essentially the same as that previously described except that only the corners 46 of the top wall 47 are reinforced with the woven material. This reduces the amount of reinforcement and the material cost associated with such, yet still provides strength in the region of the collar which is usually the most stressed upon filling.

Referring finally to FIG. 6, there is shown an alternative to woven reinforced material previously described. Here, the top wall collar is reinforced with a material made of a plastic material 50 having a loose weave of reinforcing strands 51. The stitching 39 can only tear the plastic material until it reaches the intersection of crossing strands 51 where the reinforcement of the strands prevents further tearing.

As an alternative to the previously described two ply woven material of the top wall and spout, these components may also be made of a woven polyethylene material which is preferably coated with a sealant to prevent the passage of air and moisture therethrough. Also, the liner may be secured to the bulk bag by other means, such as with staples, adhesives and adhesive tape. It should be understood that the collar may be an extension of the liner side walls rather than the top wall or be a separate portion welded to either the top wall, or the side walls of the liner.

By "reinforced" is meant herein that the flexible material is more tear and rip resistant than the material of the principle sides of the liner. Examples of such are reinforced materials are woven materials and non woven fabrics, either solely or as an additional ply or laminate to the principal liner side material which is typically blown plastic film. It should be appreciated that once blown films are perforated, as with sketches, they are susceptible to being ripped or torn in the area of perforation.

Thus, an improved liner for bulk bags is now provided which protects bulk bags from contamination to allow for their reuse. While this invention has been described in detail with particular references to preferred embodiments thereof, it should be understood that many modifications, additions and deletions may be made thereto without departure from the spirit and scope of the invention as set forth in the following claims.

I claim:

1. A bulk bag of the type used for storing and transporting fungible materials, the bulk bag having a bottom and sides, and a liner comprising a flexible plastic bottom, flexible plastic sides extending from said liner bottom to define a storage space, and a reinforced plastic collar extending from about said liner sides distally from said liner bottom; and fastening means releasibly fastening said reinforced collar to said bulk bag sides.

2. The liner of claim 1 wherein said fastening means comprises stitching.

3. The liner of claim 2 further comprising a flexible plastic top wall that overhangs said side walls, and wherein said reinforced collar forms the portion of said top wall that is located outside of said sides.

4. The liner of claim 1 further comprising a flexible plastic top extending from said sides.

5. The liner of claim 4 wherein said top wall has a spout.

6. The liner of claim 4 wherein said top is made of a reinforced mesh fiber material.

7. The liner of claim 4 or 3 wherein said collar and said top wall are of unitary construction.

8. The liner of claim 1 wherein said bottom has a collar portion outside of said liner sides at least portions of which are reinforced, and wherein said fastening means includes means for releasibly fastening said reinforced bottom collar portions to the bulk bag.

9. The liner of claim 1 wherein said liner bottom has a spout.

10. The liner of claim 1 wherein at least a portion of said liner collar is reinforced with a mesh material.

11. In a bulk bag of the type having an outer bag and a liner with a plastic bottom, plastic sides and a plastic top, the improvement comprising the liner having a flexible collar of tear limiting material extending from the periphery of said top and means for releasibly fastening said collar to the inside of the outer bag.

12. The improvement of claim 11 wherein said collar is a unitary extension of the liner top wall.

13. A bulk bag of the type used for storing and transporting fungible materials, the bulk bag comprising:

an outer air previous bag having a bottom, sides and a top;

a plastic liner positioned inside said outer bag having a bottom, sides, a top wall and a reinforced collar releasibly fastened to the inside of said outer bag sides.

14. The bulk bag of claim 13 wherein said liner top wall and said liner collar are of unitary reinforced construction, and wherein said sides are fused to said top wall adjacent the bottom of said collar.

* * * * *